(12) United States Patent
Kang et al.

(10) Patent No.: US 8,169,569 B2
(45) Date of Patent: May 1, 2012

(54) METHOD OF MAKING LIQUID CRYSTAL DISPLAY AND LIQUID CRYSTAL DISPLAY THEREOF

(75) Inventors: Min Kang, Seoul (KR); Jang-Soo Kim, Yongin-si (KR); Se-Ah Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 104 days.

(21) Appl. No.: 12/844,853

(22) Filed: Jul. 28, 2010

(65) Prior Publication Data

US 2011/0181816 A1    Jul. 28, 2011

(30) Foreign Application Priority Data

Jan. 22, 2010   (KR) .................. 10-2010-0006077

(51) Int. Cl.
*G02F 1/1335*   (2006.01)

(52) U.S. Cl. .................. 349/106; 349/107; 349/108
(58) Field of Classification Search ........... 349/106–108
See application file for complete search history.

(56) References Cited

U.S. PATENT DOCUMENTS

| | | | |
|---|---|---|---|
| 5,521,728 A | 5/1996 | Kodate et al. | |
| 6,384,882 B1 | 5/2002 | Nagayama et al. | |
| 2005/0259197 A1* | 11/2005 | Hirai et al. .................. 349/113 |

FOREIGN PATENT DOCUMENTS

| | | |
|---|---|---|
| JP | 2001-305585 A | 10/2001 |
| JP | 2003-215556 A | 7/2003 |
| JP | 2004-191972 A | 7/2004 |
| JP | 2005-077475 A | 3/2005 |
| KR | 1020030074213 A | 9/2003 |
| KR | 1020050000447 A | 1/2005 |
| KR | 1020060000808 A | 1/2006 |
| KR | 1020060043040 A | 5/2006 |
| KR | 1020070015697 A | 2/2007 |

* cited by examiner

*Primary Examiner* — Phu Vu
(74) *Attorney, Agent, or Firm* — Cantor Colburn LLP (57) ABSTRACT

A liquid crystal display includes a first insulating substrate, a data insulating layer disposed on a data wire of the first insulating substrate, and a color filter layer, an organic film layer, and a light shielding layer disposed on the data insulating layer. The organic film layer is positioned on the color filter layer, and the light shielding layer is positioned on the organic film layer in the screen display area. The color filter layer and the light shielding layer contact each other in the peripheral area.

25 Claims, 4 Drawing Sheets

METHOD OF MAKING LIQUID CRYSTAL DISPLAY AND LIQUID CRYSTAL DISPLAY THEREOF

This application claims priority to Korean Patent Application No. 10-2010-0006077, and all the benefits accruing therefrom under 35 U.S.C. §119, the entire contents of which are incorporated herein by reference.

BACKGROUND OF THE INVENTION (a) Field of the Invention

The invention relates to a method of making a liquid crystal display and a liquid crystal display thereof.

(b) Description of the Related Art

A liquid crystal display device, as one of flat panel display devices that are widely being used, includes two display panels where a field generating electrode, such as a pixel electrode and a common electrode is formed, and a liquid crystal layer interposed therebetween.

The liquid crystal display applies voltage to the field generating electrode to generate an electric field in the liquid crystal layer, thus, directions of liquid crystal molecules of the liquid crystal layer are determined and polarization of incident light is controlled so as to display images. The liquid crystal display is divided into a screen display area displaying the images, and a peripheral area formed on the periphery of the screen display area, excluding the display area, and not displaying images.

In the liquid crystal display, a thin-film transistor substrate where various signal lines, thin-film transistors, and pixel electrodes are formed, is joined to a common electrode substrate where a common electrode, etc. is formed. A cell gap between the two display substrates is supported by a column spacer.

A cell gap of a television liquid crystal display is typically approximately 4 micrometers (um), and is at least 2.8 micrometers (um).

BRIEF SUMMARY OF THE INVENTION

In an exemplary embodiment of a liquid crystal display according to the invention, a data insulating layer, a color filter layer, and an organic film layer are formed on a data line of a thin-film transistor substrate. A column spacer and a light shielding layer are formed at the same time, and an organic film material is selectively removed in order to improve a light shielding effect of the light shielding layer in a peripheral area outside a screen display area of the liquid crystal display. The color filter layer is formed on the data insulating layer in order to reduce or effectively prevent the data insulating layer previously patterned by using the organic film as a mask, from being removed together with the organic film when the organic film material is selectively removed.

An exemplary embodiment of the invention provides a liquid crystal display including a first insulating substrate including a screen display area and a peripheral area, a data wire disposed on the first insulating substrate, a data insulating layer disposed on the data wire, and a color filter layer, an organic film layer, and a light shielding layer disposed on the data insulating layer. The organic film layer is positioned on the color filter layer, and the light shielding layer is positioned on the organic film layer in the screen display area. The color filter layer and the light shielding layer contact each other in the peripheral area.

The liquid crystal display may further include a first contact hole of the data insulating layer disposed at the same position as an opening pattern of the organic film layer, in the screen display area. A second contact hole of the data insulating layer may be disposed at the same position as an opening portion of the color filter layer, in the peripheral area.

The liquid crystal display may further include a second insulating substrate, and a column spacer supporting a cell gap between the first insulating substrate and the second insulating substrate. The light shielding layer may be made of a same material as the column spacer.

A thickness of the color filter layer of the peripheral area may be about 1.0 micrometer (um) or less.

The cell gap may be about 3.8 um or less.

A side of the first contact hole of the data insulating layer, and a side of an opening pattern of the organic film layer, may be continuous.

The liquid crystal display may further include a protrusion pattern made of a same material as the organic film layer, in the peripheral area.

The light shielding layer positioned in the peripheral area may include a column spacer portion corresponding to the protrusion pattern, and projecting higher from the first insulating substrate than a remaining portion of the light shielding layer.

The color filter layer positioned below the protrusion pattern and the column spacer, may be a blue color filter layer.

Another exemplary embodiment of the invention provides a method of making a liquid crystal display, the method including forming a data wire on a first insulating substrate including a peripheral area, forming a data insulating layer on the data wire, and forming a color filter layer, an organic film layer, and a light shielding layer on the data insulating layer. The forming a color filter layer, a organic film layer, and a light shielding layer includes selectively removing an organic film layer material and etching the data insulating layer, by using the color filter layer as a mask, in the peripheral area.

The method may further include disposing a second insulating substrate on the first insulating substrate. The forming a light shielding layer may include forming a column spacer supporting a cell gap between the first insulating substrate and the second insulating substrate.

The forming a color filter layer may include performing an exposing operation by using a semi-transmissive mask corresponding to the peripheral area.

When the organic film layer material is selectively removed in the peripheral area in forming the organic film layer, a protrusion pattern corresponding to the column spacer may remain and a remainder of the organic film layer material may be removed.

According to an exemplary embodiment of the invention, a data insulating layer, a color filter layer, and an organic film layer are formed on a data line of a substrate. A column spacer and a light shielding layer are formed at the same time, and an organic film is selectively removed in order to improve a light shielding effect by increasing the thickness of the light shielding layer in a peripheral area outside a screen display area. The color filter layer having a thickness of about 1.0 um or less is formed on the data insulating layer of the peripheral area in order to reduce or effectively prevent the data insulating layer previously dry-etched by using the organic film as a mask, from being removed together with the organic film.

Therefore, in the peripheral area of a thin-film transistor substrate, where both the column spacer and the light shielding layer are disposed, it is possible to improve the light shielding effect by increasing the thickness of the light shielding layer, and to reduce or effectively prevent the data insulating layer protecting a data wire from being dry-etched.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

In the following detailed description, exemplary embodiments of the invention have been shown and described, simply by way of illustration. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art.

As those skilled in the art would realize, the described embodiments may be modified in various different ways, all without departing from the spirit or scope of the invention. The drawings and description are to be regarded as illustrative in nature and not restrictive. Like reference numerals designate like elements throughout the specification. As used herein, the term "and/or" includes any and all combinations of one or more of the associated listed items. Further, a detailed description of the widely known related art will be omitted. In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present. In contrast, it will be understood that when an element is referred to as being "directly on" another element, no intervening element is present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

It will be understood that when an element such as a layer, film, region, or substrate is referred to as being "below" another element, it can be directly below the other element or intervening elements may also be present.

Spatially relative terms, such as "below," "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In an exemplary embodiment of a liquid crystal display, signal lines such as gate wires, data wires, etc. are disposed on a thin-film transistor substrate. A data insulating layer for protecting the data wire is disposed on the data lines, and a color filter layer is disposed on the data insulating layer. An organic film layer for planarizing the color filter layer is disposed on an upper surface of the color filter layer, and a transparent pixel electrode is disposed on the top of the organic film layer. A light shielding layer, in addition to a column spacer, is disposed on the transparent pixel electrode.

In a structure in which both the column spacer and the light shielding layer are disposed on the transparent pixel electrode, the optical density of the light shielding layer decreases, thus, the light shielding layer of a peripheral area of the liquid crystal display does not fully shield light, such that a light leakage phenomenon occurs in the peripheral area.

Hereinafter, the liquid crystal display in the related art of the invention will be described in detail with reference to FIGS. 1 and 2.

Figure 1:
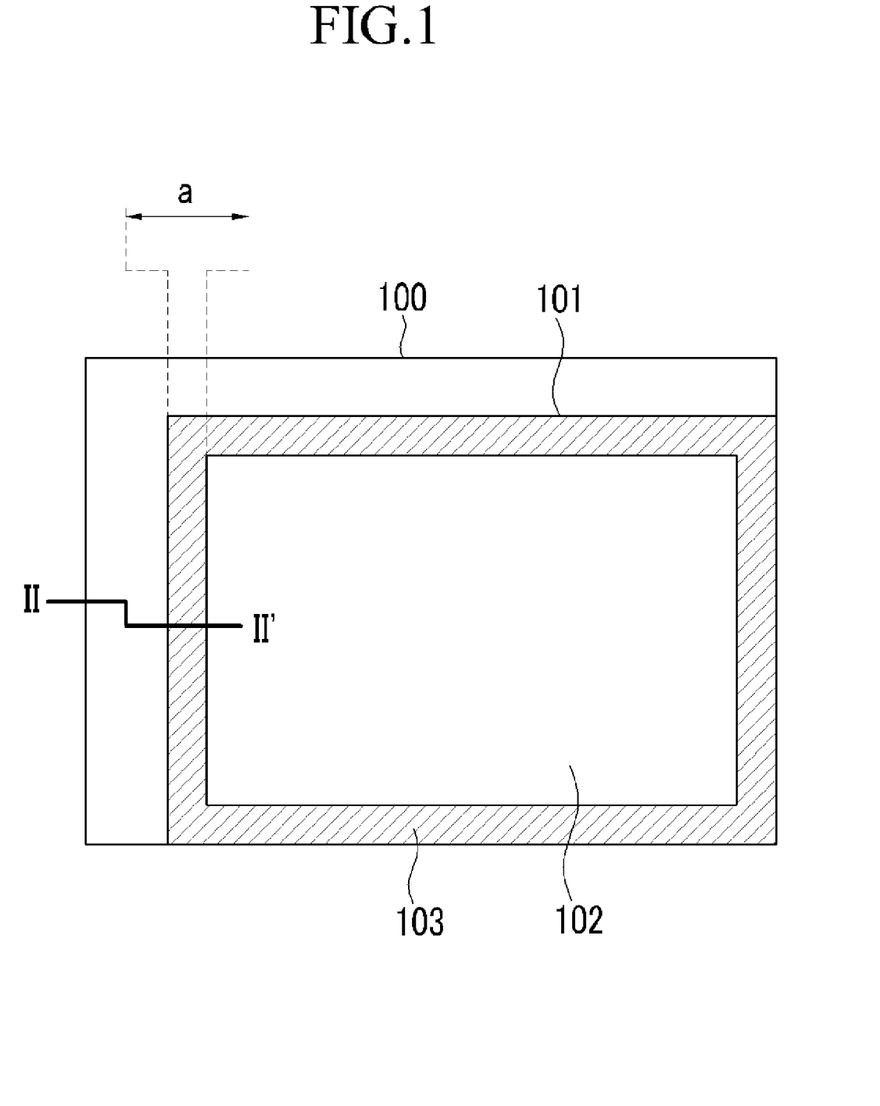
FIG. 1 is a plan view of an exemplary embodiment of a liquid crystal display, according to the invention.
Figure 2:
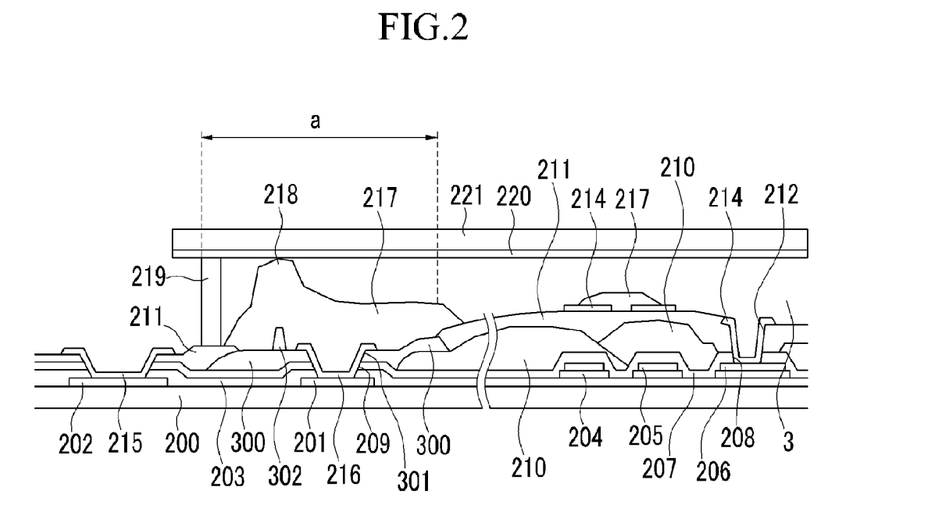
FIG. 2 is a cross-sectional view taken along line II-II' of FIG. 1.

FIG. 1 is a plan view of an exemplary embodiment a liquid crystal display, according to the invention, and FIG. 2 is a cross-sectional view taken along line II-II' of FIG. 1.

The liquid crystal display includes two display substrates, such as a thin-film transistor substrate 100 and a common electrode substrate 101. The liquid crystal display is divided into a screen display area 102 displaying images, and a peripheral area 103 excluding the screen display area, and not displaying images. Signal lines (not shown) such as gate wires, data wires, etc. are disposed on the thin-film transistor substrate 100. A data insulating layer for protecting data is disposed on the data lines and a color filter layer is disposed on the data insulating layer.

The peripheral area 103 is a portion of the liquid crystal display, excluding the screen display area 102. The peripheral area 103 extending from a portion of the liquid crystal display where the thin-film transistor substrate 100 and the common electrode substrate 101 are joined to each other, is indicated by the shaded part of FIG. 1.

The liquid crystal display according to the illustrated exemplary embodiment of the invention will be described with reference to FIG. 2.

First, the thin-film transistor substrate 100 will be described.

The thin-film transistor substrate 100 includes a first wiring layer which includes gate metal, and which is disposed directly on a first insulating substrate 200. The first wiring layer includes a gate metal pattern 201 and a gate pad pattern 202.

A gate insulating layer 203 is disposed directly on and contacting the first wiring layer including the gate metal.

A semiconductor layer 204 including a semiconductor material is disposed directly on the gate insulating layer 203 and a second wiring layer which includes data metal, and which is disposed directly on the semiconductor layer 204 and on the gate insulating layer 203. The second wiring layer includes a data wire 205 and a drain electrode 206.

A data insulating layer 207 including an inorganic insulating material such as silicon nitride (SiNx), etc. is disposed directly on the gate insulating layer 203, on the semiconductor layer 204, and on the second wiring layer including the data metal.

A color filter layer includes a plurality of a first color filter 210 and a plurality of a second color filter 300 disposed on an upper surface of the data insulating layer 207 opposing the first insulating substrate 200.

The color filters 210 and 300 may include different materials from each color. As illustrated in FIG. 2, each of the color filters 210 and 300 are divided into discrete single unitary and indivisible portions. Portions of the color filters 210 may overlap each other in a plan view of the liquid crystal display, while portions of the color filters 300 may be separated from each other in the plan view. A portion of the color filters 210 may overlap with a portion of the color filters 300 in the plan view.

The color filters 210 and 300 may be color filters including different materials. The color filter 300 is a color filter disposed substantially entirely or entirely in the peripheral area 'a' of the liquid crystal display, as indicated by area 'a' in FIGS. 1 and 2.

In one exemplary embodiment, the color filter 300 of the peripheral area 'a' may be a blue color filter in order to reduce light leakage.

An organic film layer 211 is disposed on the color filter 210. The organic film layer 211 is disposed substantially outside of the peripheral area 'a'. In one exemplary embodiment, no portion of the organic film layer 211 may be disposed in the peripheral area 'a', such that the organic film layer 211 does not overlap any portion of the color filter 300 disposed in the peripheral area 'a'.

Although exemplary embodiments may include the organic film layer 211 not overlapping any portion of the color filter 300 disposed in the peripheral area 'a', alternatively, a portion of the organic film layer 211 may overlap a portion of the color filter 300 in the plan view of the liquid crystal display, as illustrated in FIG. 2.

A protrusion pattern 302 is disposed overlapping and aligned with the color filter 300 in the peripheral area 'a'. In an exemplary embodiment of a method of forming the liquid crystal display, at substantially a same time as removing organic film layer material in forming the organic film layer, the protrusion pattern 302 may remain disposed at a position on the color filter 300 in the peripheral area 'a', where the column spacer 218 will be formed thereafter.

The protrusion pattern 302 serves to define and maintain the column spacer 218 to have a sufficient height taken in a direction perpendicular to the first insulating substrate 200.

According to FIG. 2, the color filter 300 of the peripheral area 'a', the protrusion pattern 302, and the column spacer 218 are disposed in sequence from the first insulating substrate 200.

A pixel electrode 214 including a transparent conductive material, an auxiliary pad 215, and/or a connection member 216 are disposed on and overlapping a portion of an upper surface of the organic film layer 211.

The pixel electrode 214 is electrically and physically connected with the drain electrode 206 exposed through a contact hole 208, and an opening pattern 212 disposed in the color filter 210 and the organic film layer 211, respectively.

The auxiliary pad 215 is electrically and physically connected with the gate pad pattern 202 exposed through the gate insulating layer 203, the data insulating layer 207, and the organic film layer 211.

The connection member 216 is electrically connected with the gate metal pattern 201 exposed through the gate insulating layer 203, the data insulating layer 207, and the color filter 300. In FIG. 2, a contact hole 209 of the data insulating layer 207, and an opening portion 301 of the color filter 210 are displayed.

A light shielding layer 217 and the column spacer 218 are disposed on and contacting the organic film layer 211 and the color filter 300 of the thin-film transistor substrate 100. The light shielding layer 217 and the column spacer 218 include a black organic material. Portions of the light shielding layer 217 are disposed in both the display area 102 and the peripheral area 'a'.

In contrast, the column spacer 218 is disposed only in the peripheral area 'a'. The light shielding layer 217 and the column spacer 218 of the peripheral area 'a' are continuous with each other, such that the light shielding layer 217 and the column spacer 218 collectively form a single unitary indivisible member, as illustrated in FIG. 2.

The column spacer 218 is disposed at a position corresponding to and aligned with the protrusion pattern 302. The column spacer 218 is projected higher relative to the first insulating substrate 200 than a remaining portion of the light shielding layer 217, due to the protrusion pattern 302, and serves to keep a cell gap constant.

Since both the column spacer 218 and the light shielding layer 217 are disposed in the peripheral area 'a', the optical density of the light shielding layer 217 is not decreased, thus, the light shielding layer 217 of a peripheral area effectively fully shields light, such that a light leakage phenomenon does not occur in the peripheral area 'a' of the liquid crystal display.

In the illustrated exemplary embodiment, the thin-film transistor substrate 100 includes elements from the lowermost element of the first insulating substrate 200, through uppermost elements such as the light shielding layer 217 and the column spacer 218.

In the common electrode substrate 101, a common electrode 220 is disposed on a first (e.g., lower) surface of a second insulating substrate 221.

The thin-film transistor substrate 100 and the common electrode substrate 101 are bonded to each other by a sealant 219, and a liquid crystal layer 3 is injected therebetween.

The cell gap between the thin-film transistor substrate 100 and the common electrode substrate 101 is constantly kept by a spacer, such as including the column spacer 218. In one exemplary embodiment, the cell gap taken in the direction perpendicular to the insulating substrates 200 and 221, may be about 3.8 micrometers (um) or less.

In the illustrated embodiment of the invention, as shown in FIG. 2, the color filter 300 is provided in the peripheral area 'a', and positions of the opening portion 301 disposed extending through the color filter 300 of the peripheral area 'a' and of the contact hole 209 of the data insulating layer 207, are the same as each other, such that the opening portion 301 and the contact hole 209 are aligned with each other in the plan view of the liquid crystal display.

Further, in the screen display area 102, positions of the contact hole 208 of the data insulating layer 207 and the opening pattern 212 of the organic film layer 211 are the same as each other, such that the opening pattern 212 and the contact hole 208 are aligned with each other in the plan view of the liquid crystal display.

Hereinafter, an exemplary embodiment of a method of making a liquid crystal display, according to the invention will be described in detail with reference to FIGS. 3 to 7.

FIGS. 3 to 7 are diagrams sequentially showing a portion of an exemplary embodiment of a method of making the liquid crystal display, according to the illustrated embodiment of FIGS. 1 and 2.

Figure 3:
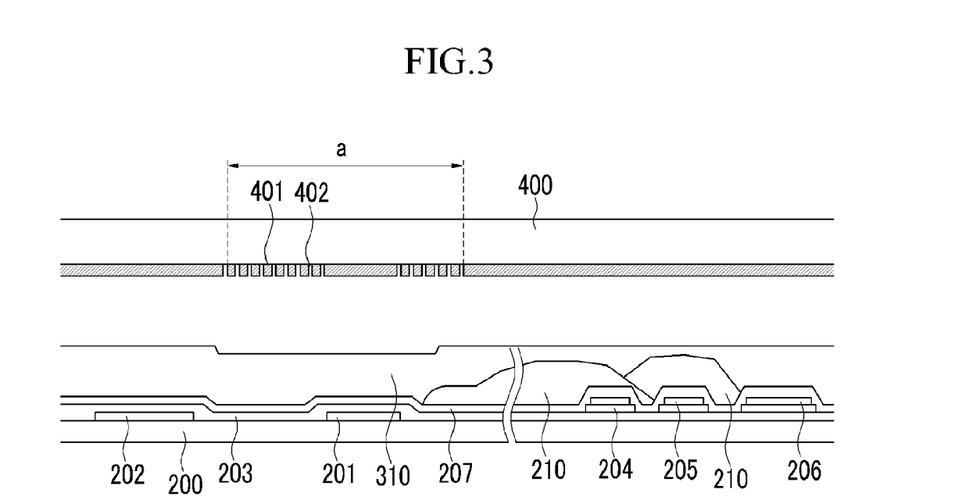
FIGS. 3 to 7 are diagrams sequentially showing an exemplary embodiment of a method of forming the liquid crystal display, according to the embodiment of FIGS. 1 and 2.

FIG. 3 shows forming a color filter 300 in a peripheral area 'a'.

To form the structure in FIG. 3, prior to forming the color filter 300, a gate pad pattern 202 and a gate metal pattern 201 are formed on a first insulating substrate 200, such as by using gate metal.

Thereafter, a gate insulating layer 203 is deposited, and a semiconductor layer 204, a data wire 205, and a drain electrode 206 are formed, such as by sequentially depositing and etching a semiconductor material and data metal thereon, respectively.

Thereafter, a data insulating layer 207 protecting a data wire, etc. is deposited, such as by using an inorganic insulating layer including silicon nitride (SiNx), and a color filter 210 is formed such as by coating, exposing, and developing a color filter material onto an upper surface of the data insulating layer 207.

Thereafter, as shown in FIG. 3, a color filter material 310, to form the color filter 300, is deposited on substantially an entire surface of the first insulating substrate 200 including in the peripheral area 'a'.

Figure 4:
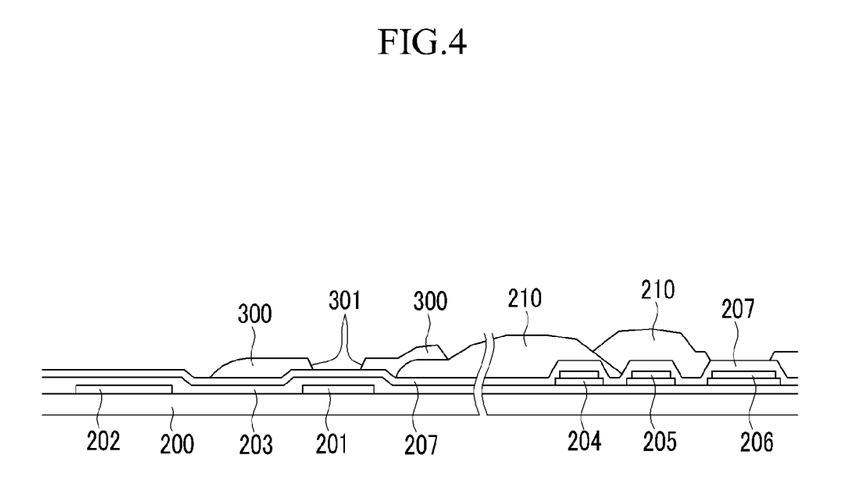

A state after the deposited color filter material 310 is etched is shown in FIG. 4.

A connection member contact opening portion 301 is formed in the color filter 300 of the peripheral area 'a' so as to contact a connection member 216 (FIG. 7) including transparent pixel electrode metal, and the gate metal pattern 201 with each other.

If the color filter 300 of the peripheral area 'a' has a too large a thickness in the direction perpendicular to the first insulating substrate 200, the thickness of a light shielding layer 217 (FIG. 2) thereafter positioned on the top of the color filter 300, cannot be made larger. Therefore, the thickness of the color filter 300 of the peripheral area 'a' may be about 1.0 um or less.

Since a thickness of the color filter 210 within a display area is about 1.5 um or more, when the color filter material 310 is exposed, the peripheral area 'a' is exposed by using a semi-transmissive mask 400, etc. including a slit pattern having a line width and an interval lower than the resolution of an exposure device as shown in FIG. 3, in order to decrease the thickness of the color filter 300 of the peripheral area 'a' to about 1.0 um or less.

In the exposing the color filter material 310 in the peripheral area 'a', the slit pattern of the semi-transmissive mask 400 may include slits 401 including chrome (Cr), etc., and an opening portion 402 interposed therebetween.

The resulting color filter 300 of the peripheral area 'a' corresponds to the slit pattern of the mask 400. The connection member contact opening portion 301 is an area which is exposed or not exposed, depending on a photosensitive characteristic, thus, the color filter material 310 is completely removed from the area of the resulting connection member contact opening portion 301, as illustrated in FIG. 4.

As shown in FIG. 3, the color filter material 310 is not exposed (e.g., is overlapped by a portion of the slits 401), thus, the opening portion 301 is formed to exclude any color filter material 310 or resulting color filter 300.

Figure 5:
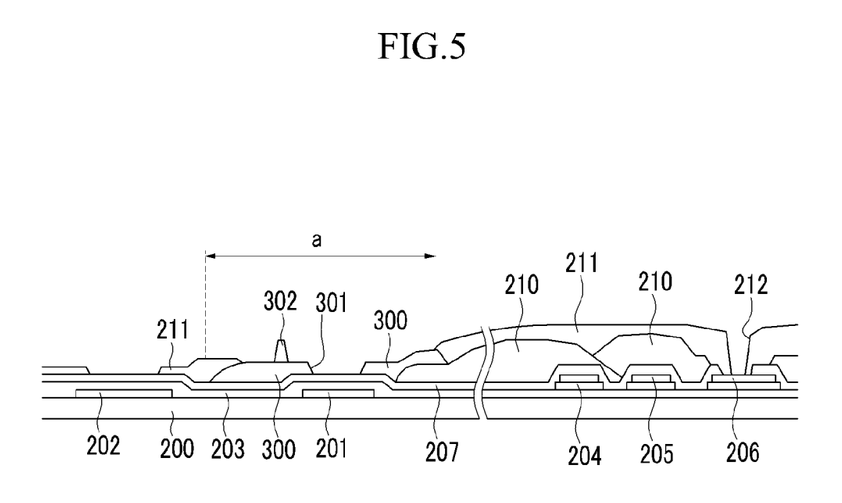

Thereafter, as shown in FIG. 5, an organic film layer 211 is formed such as by coating, exposing, and developing an organic material. A drain electrode contact opening pattern 212 is formed in order to planarize the color filter 210.

At substantially a same time as or after the forming the organic film layer 211, in the peripheral area 'a', all remaining organic materials, except for an island-shaped organic film protrusion pattern 302 disposed where a column spacer 218 is to be formed, are removed.

In the illustrated embodiment, the column spacer 218 and the light shielding layer 217 are formed at the same time, the remaining organic materials are removed in order to improve a light shielding effect of the light shielding layer 217 in the peripheral area 'a' outside a screen display area, and the color filter 300 is formed overlapping the data insulating layer 207 in the peripheral area 'a' in order to reduce or effectively prevent the previously formed data insulating layer 207 from being removed together with the organic film layer 211.

Since both the column spacer 218 and the light shielding layer 217 are formed in the peripheral area 'a', the optical density of the light shielding layer 217 is not decreased, thus, the light shielding layer 217 of a peripheral area effectively fully shields light, such that a light leakage phenomenon does not occur in the peripheral area 'a' of the liquid crystal display.

Figure 6:
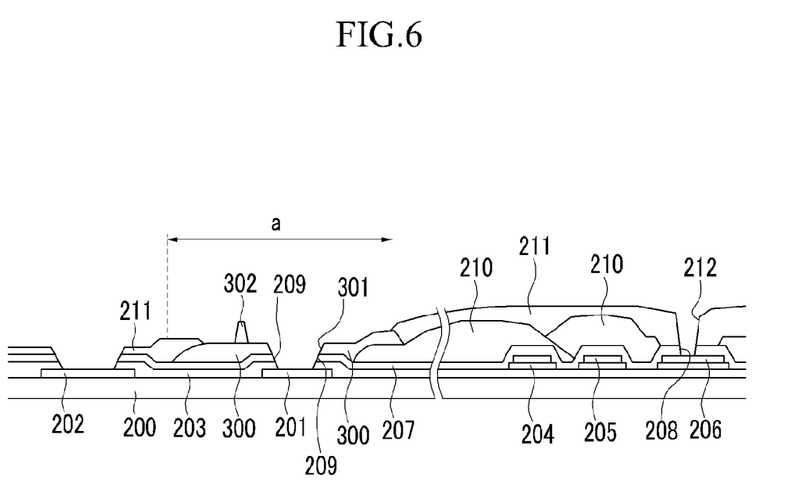

Thereafter, as shown in FIG. 6, the data insulating layer 207 is dry-etched by using the organic film layer 211 as a mask.

In the dry-etching the data insulating layer 207, in the peripheral area 'a', the color filter 300 serves as the mask instead of the organic film layer 211, to reduce or effectively prevent etching of the data insulating layer 207.

Therefore, a connection member contacting contact hole 209 is formed in the data insulating layer 207 in a same position of the peripheral area 'a' as the connection member contacting opening portion 301 of the color filter 300. The connection member contacting contact hole 209 is consequently aligned with the connection member contacting opening portion 301. A drain electrode contact hole 208 is formed in the data insulating layer 207 in a same position of the screen display area as the drain electrode opening pattern 212 formed in the organic film layer 211. The drain electrode contact hole 208 is consequently aligned with the drain electrode opening pattern 212.

When the connection member contacting contact hole 209 is aligned with the connection member contacting opening portion 301, inner surfaces of the connection member contacting contact hole 209 and inner surfaces of the connection member contacting opening portion 301, may be continuous. Similarly, when the drain electrode contact hole 208 is aligned with the drain electrode opening pattern 212, inner surfaces of the contact hole 208 of the data insulating layer 207 and inner surfaces of the opening pattern 212 of the organic film layer 211, may be continuous.

Figure 7:
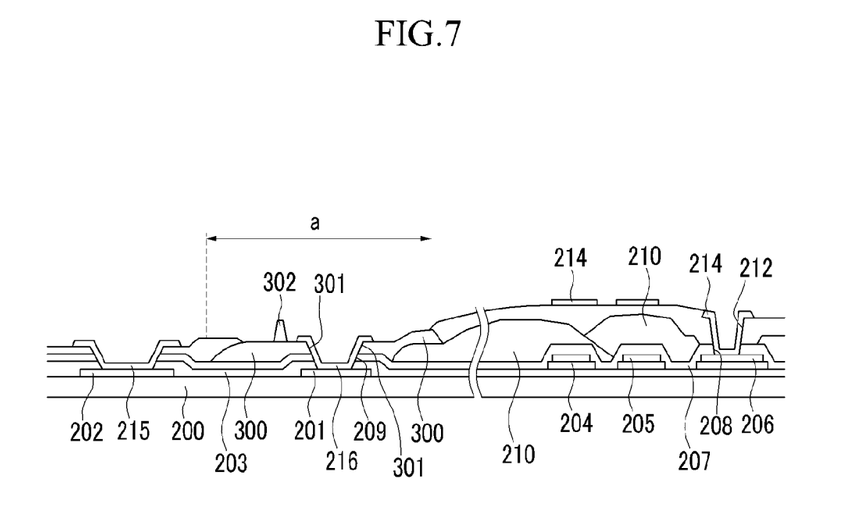

Thereafter, as shown in FIG. 7, a transparent pixel electrode 214 and a connection member 216 are formed on and overlapping an upper surface of the organic film layer 211.

Thereafter, as shown in FIG. 2, both the column spacer 218 supporting a cell gap, and the light shielding layer 217 which include a black organic material are formed directly on the transparent pixel electrode 214 and the connection member 216, respectively.

Referring to FIG. 2, the common electrode substrate 101 is assembled by forming the common electrode 220 on the second insulating substrate 221.

Thereafter, the thin-film transistor substrate 100 and the common electrode substrate 101 are bonded to each other by the sealant 219, etc. When the thin-film transistor substrate 100 and the common electrode substrate 101 are bonded to each other, a cell gap between the two substrates may be about 3.8 um or less.

A structure of a liquid crystal display including the protrusion pattern 302, is formed by removing organic materials and forming the organic film layer 211. The protrusion pattern 302 of a final liquid crystal display, which is disposed at a location overlapping and aligned with both the color filter 300 and the column spacer 218, is considered a structural characteristic of the final liquid crystal display. Since the specific location of the protrusion pattern 302 is imparted by forming of the organic film layer 211 in selectively removing organic materials, the selective removing of the organic materials in forming the organic film layer 211 to leave the protrusion pattern 302, is considered to impart the distinct structural characteristic of the protrusion pattern 302 disposed at a location overlapping and aligned with both the color filter 300 and the column spacer 218.

It is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first insulating substrate including a display area and a non-display peripheral area;
a data wire disposed on the first insulating substrate;
a data insulating layer disposed on the data wire; and
a color filter layer, an organic film layer, and a light shielding layer disposed on the data insulating layer,
wherein
the organic film layer overlaps the color filter layer, and the light shielding layer overlaps the organic film layer in the display area, and
the color filter layer and the light shielding layer contact each other in the peripheral area.

2. The liquid crystal display of claim 1, further comprising:
a first contact hole of the data insulating layer aligned with an opening pattern of the organic film layer, in the display area, and
a second contact hole of the data insulating layer aligned with an opening portion of the color filter layer, in the peripheral area.

3. The liquid crystal display of claim 2, further comprising:
a second insulating substrate; and
a column spacer supporting a cell gap between the first insulating substrate and the second insulating substrate,
wherein the light shielding layer includes a same material as the column spacer.

4. The liquid crystal display of claim 3, wherein:
a thickness of the color filter layer of the peripheral area is about 1.0 micrometer (um) or less.

5. The liquid crystal display of claim 4, wherein:
the cell gap is about 3.8 um or less.

6. The liquid crystal display of claim 3, wherein:
the cell gap is about 3.8 um or less.

7. The liquid crystal display of claim 2, wherein:
a thickness of the color filter layer of the peripheral area is about 1.0 um or less.

8. The liquid crystal display of claim 7, wherein:
the cell gap is about 3.8 um or less.

9. The liquid crystal display of claim 2, wherein:
the cell gap is about 3.8 um or less.

10. The liquid crystal display of claim 1, further comprising:
a second insulating substrate; and
a column spacer supporting a cell gap between the first insulating substrate and the second insulating substrate,
wherein the light shielding layer includes a same material as the column spacer.

11. The liquid crystal display of claim 10, wherein:
a thickness of the color filter layer of the peripheral area is about 1.0 um or less.

12. The liquid crystal display of claim 11, wherein:
the cell gap is about 3.8 um or less.

13. The liquid crystal display of claim 10, wherein:
the cell gap is about 3.8 um or less.

14. The liquid crystal display of claim 1, wherein:
a thickness of the color filter layer of the peripheral area is about 1.0 um or less.

15. The liquid crystal display of claim 14, wherein:
the cell gap is about 3.8 um or less.

16. The liquid crystal display of claim 1, wherein:
the cell gap is about 3.8 um or less.

17. The liquid crystal display of claim 2, wherein:
a side of the first contact hole of the data insulating layer, and a side of the opening pattern of the organic film layer are continuous.

18. The liquid crystal display of claim 1, further comprising:
a protrusion pattern including a same material as the organic film layer, and disposed in the peripheral area.

19. The liquid crystal display of claim 18, wherein:
the light shielding layer disposed in the peripheral area includes a column spacer portion overlapping the protrusion pattern, the column spacer portion having a thickness larger than a remaining portion of the light shielding layer.

20. The liquid crystal display of claim 19, wherein:
the color filter layer overlapping the protrusion pattern and the column spacer portion is a blue color filter layer.

21. A method of making a liquid crystal display, the method comprising:
forming a data wire on a first insulating substrate including a non-display peripheral area;
forming a data insulating layer on the data wire; and
forming a color filter layer, an organic film layer, and a light shielding layer on the data insulating layer,
wherein the forming a color filter layer, an organic film layer, and an light shielding layer includes selectively removing organic film layer material and etching the data insulating layer by using the color filter layer as a mask, in the peripheral area.

22. The method of making a liquid crystal display of claim 21, further comprising:
disposing a second insulating substrate on the first insulating substrate,
wherein the forming a light shielding layer includes forming a column spacer supporting a cell gap between the first insulating substrate and the second insulating substrate.

23. The method of making a liquid crystal display of claim 22, wherein:
the forming a color filter layer includes performing an exposing operation by using a semi-transmissive mask corresponding to the peripheral area.

24. The method of making a liquid crystal display of claim 21, wherein:
the forming a color filter layer includes performing an exposing operation by using a semi-transmissive mask corresponding to the peripheral area.

25. The method of making a liquid crystal display of claim 21, wherein:
when the organic film layer material is selectively removed in the peripheral area in forming the organic film layer, a protrusion pattern overlapping the column spacer remains, and a remainder of the organic film layer material is removed.

* * * * *